(12) United States Patent
Burbidge, III et al.

(10) Patent No.: US 7,346,807 B1
(45) Date of Patent: Mar. 18, 2008

(54) OPTIMIZING TRANSACTION DATA FOR LOAD TESTING

(75) Inventors: Theodore A. Burbidge, III, Olathe, KS (US); David W. Dankenbring, Overland Park, KS (US); Charles L. Micklavzina, Overland Park, KS (US); Kevin R. Niederhauser, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 523 days.

(21) Appl. No.: 10/885,814

(22) Filed: Jul. 7, 2004

(51) Int. Cl.
*G06F 11/00* (2006.01)

(52) U.S. Cl. .................... 714/25; 714/47; 702/182; 702/186

(58) Field of Classification Search ............... 702/186, 702/182
See application file for complete search history.

(56) References Cited

U.S. PATENT DOCUMENTS

| | | | |
|---|---|---|---|
| 5,920,722 A | 7/1999 | Damron | 395/706 |
| 6,249,886 B1 | 6/2001 | Kalkunte | 714/47 |
| 6,449,739 B1 | 9/2002 | Landan | 714/47 |
| 6,775,824 B1* | 8/2004 | Osborne et al. | 717/125 |
| 6,859,922 B1* | 2/2005 | Baker et al. | 717/125 |
| 6,934,934 B1* | 8/2005 | Osborne et al. | 717/126 |
| 6,978,218 B1* | 12/2005 | Kolb et al. | 702/122 |
| 6,993,458 B1* | 1/2006 | Castelli et al. | 702/186 |
| 6,993,747 B1* | 1/2006 | Friedman | 717/124 |
| 2003/0191985 A1* | 10/2003 | Barrett | 714/32 |
| 2004/0068560 A1* | 4/2004 | Oulu et al. | 709/224 |
| 2005/0091005 A1* | 4/2005 | Huard | 702/186 |

* cited by examiner

*Primary Examiner*—Yolanda L Wilson

(57) ABSTRACT

A system to load test a computer system is provided. The system comprises a test script to generate transactions including a basis transaction, the basis transaction operable to initiate a conversation with a stateful enterprise java bean, and a non-basis transaction. The system also comprises a forecast and a transaction iteration calculator, the transaction iteration calculator operable to determine how often the non-basis transaction executes relative to the basis transaction. For a non-basis transaction having a forecast less than the forecast of the basis-transaction, the non-basis transaction executes once if the number given by a randomly selected number between zero and the basis transaction forecast is less than the forecast of the non-basis transaction forecast and zero times otherwise. For a non-basis transaction having a forecast more than the forecast of the basis-transaction, the non-basis transaction may execute according to another calculation. A script controller is also provided.

25 Claims, 3 Drawing Sheets

OPTIMIZING TRANSACTION DATA FOR LOAD TESTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to load testing computer software, and more particularly, but not by way of limitation, to a system and method for generating test data and for using the test data to test a back-end computer system.

BACKGROUND OF THE INVENTION

Enterprises need to anticipate when the processing load on their computer systems, such as a customer service system, will exceed the system capacity in order to expand the system capacity in time to avoid service outages. In some cases, delays in handling, for example, customer calls due to inadequate computer system resources can be directly linked to quantifiable losses of revenue. Expanding computer system capacity before it is required, merely to ensure that the computer system capacity is not exceeded, results in sinking enterprise capital into computing resources well before these resources are actually needed.

Enterprises may conduct load testing of their computer systems to evaluate when increasing customer service loads will exceed system capacity and to evaluate system processing barriers. For example, it may be that the computer system has adequate processing power, but that a communication bottleneck, such as between the processors and the secondary storage causes system transaction throughput to slow down.

The "busy hour" is a term of art which refers to a peak activity period for the computer system. In some circumstances, the "busy hour" may refer to a peak activity period for the computer system during a month or during a year. In some cases the annual busy hour may be the preferred test of the computer system, for example the mother's day busy hour for long distance telephone service. In other cases the monthly busy hour may be the preferred test of the computer system, for example a computer system which processes monthly reports or bills. Load testing activities may be directed to determining whether the computer system is able to process the busy hour transaction load without crashing or without exceeding response time requirements.

In the process of rolling out new or modified software or systems, it is may be preferable to test the software and systems under real-world conditions before putting them into a production environment. By creating or simulating production loads, flaws or weaknesses in the code or systems may also be uncovered and repaired or improved prior to actual implementation.

SUMMARY OF THE INVENTION

A system to load test a computer system is provided. The system comprises a test script to generate transactions including a basis transaction, the basis transaction operable to initiate a conversation with a stateful enterprise java bean, and a non-basis transaction. The system also comprises a forecast and a transaction iteration calculator, the transaction iteration calculator operable to determine how often the non-basis transaction executes relative to the basis transaction. For a non-basis transaction having a forecast less than the forecast of the basis-transaction, the non-basis transaction executes once if the number given by rand(0,basisTransactionForecast) is less than the forecast of the non-basis transaction forecast and zero times otherwise. For a non-basis transaction having a forecast more than the forecast of the basis-transaction, the non-basis transaction executes the number of times given by rand(0,(2*nonBasisTransactionForecast/basisTransactionForecast)). The system also comprises a controller which controls execution of the test script.

An alternate system to load test a computer system is also provided. The system comprises forecasts, each forecast containing a predicted volume of a transaction type and a transaction iteration calculator to determine how many transactions of a transaction type are to be generated based on the forecast associated with a basis transaction and with a non-basis transaction, the transaction iteration calculator controlling the mix of transactions. The system also includes a test script to generate the transactions, the script containing a loop, and a test controller that starts one or more instances of the test script to control the volume of transactions generated.

A method for load testing a computer system is also provided. The method includes providing forecasts to a transaction iteration calculator, each forecast containing a predicted volume of a transaction type. The method includes generating a basis transaction and providing the basis transaction to the computer system. The method provides for generating a non-basis transaction a number of times to achieve an appropriate mix relative to the basis transaction based on the forecasts. The method includes providing the non-basis transactions to the computer system, and repeating the generation of the basis transaction. The method also includes providing the basis transaction to the computer system, generating the non-basis transaction, and sending the non-basis transactions to the computer system.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
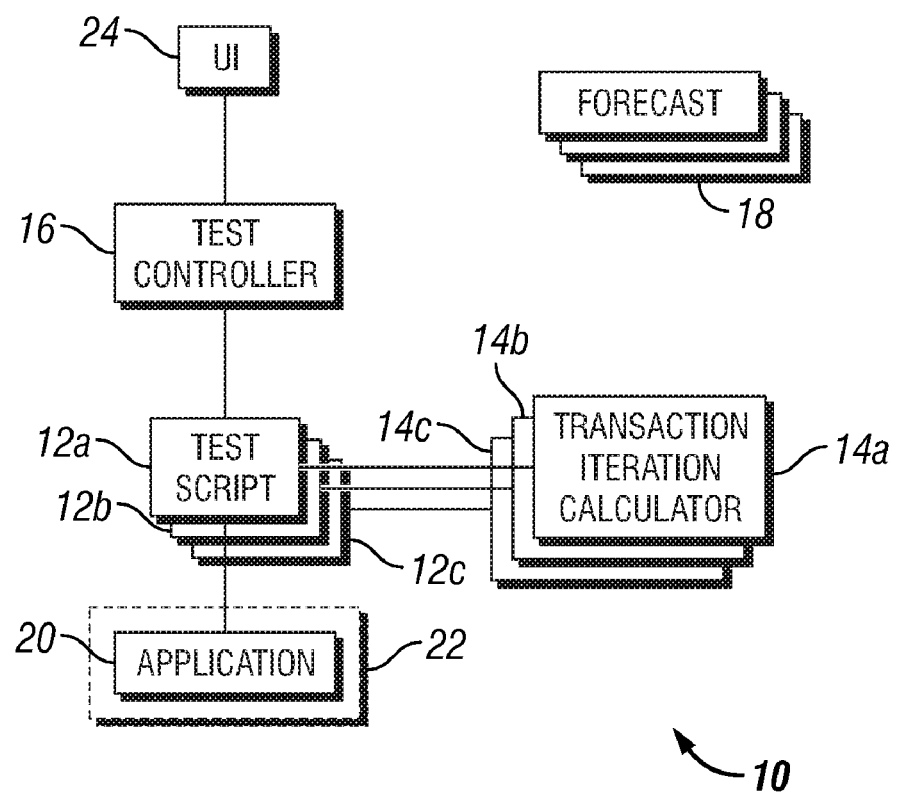
FIG. 1 is a block diagram of a load testing system, according to an embodiment of the present disclosure.

Turning now to FIG. 1 a block diagram depicts a system 10 for load testing a computer system 22 according to an embodiment of the present disclosure. The system 10 includes a test script 12, a transaction iteration calculator 14, a test controller 16, and a plurality of forecasts 18. The test script 12 generates transactions and sends them to an application 20 which executes on the computer system 22, thereby imposing a processing load on the computer system 22. Each forecast 18 identifies a transaction type and a frequency or a number describing how often transactions of that transaction type are expected to be executed on the computer system 22 during the busy hour. The test controller 16 starts and controls one or more test scripts 12, in response to commands received from a user interface (UI) 24.

The test script 12 provides a sequence of instructions within a repeating or iterating loop. When the test script 12 is executed, the instructions within the loop are executed in sequence. One execution of the instructions in the loop may be termed an iteration of the test script 12. When the end of the loop is reached, execution of the test script 12 returns to the instructions at the beginning of the loop and starts executing the instructions in sequence again. The instructions may include blocks of instructions each directed to invoking, for example, an application programming interface (API) call to request the application 20 to perform a transaction of one specific type: this may be termed generating a transaction.

The forecast 18 is defined by estimating how many transactions of the subject transaction type will be generated in the busy hour. The process of defining forecasts may be based on analysis of historic operation data or on another method such as projecting a data trend. This process of defining forecasts may also be based on estimating the impact of a substantial computer system load increase, such as adding an additional corporate account consisting of 10,000 telephone lines to a telephone service billing computer system. Load testing of the computer system 22 may be directed to testing using forecasts 18 associated with a near-term busy hour, such as a monthly busy hour to occur in three months. Alternately, load testing of the computer system 22 may be directed to testing using forecasts 18 associated with a long-term busy hour, such as a monthly busy hour to occur in twelve months. Both of these load tests, according to a near-term and a long-term busy hour, may be used to project computer system requirements and to allocate budget and personnel to install and bring up computer system resources in a timely, cost effective manner.

The first API call in the loop of the test script 12 may be an unconditioned single call to generate a basis transaction. The basis transaction may execute first to provide appropriate initializations of the application 20, such as for example when the API call is made using a stateful enterprise java bean (EJB). A component of the present load balancing technique considers the basis transactions in order to achieve an appropriate balance when load testing in environments using stateful objects, such as stateful EJBs. Load balancing techniques used in other environments, such as those that do not involve or consider basis transactions, may not achieve the desired mix or balance of transactions if employed in the present environment.

In the preferred embodiment, the sequence of instructions provided by the test script 12 are all method calls on the same instance of a stateful EJB, for example a phone service subscription stateful EJB. A stateful EJB maintains conversational state or instance data pertaining to the client of the bean, for example the test script 12, between method calls. In an embodiment, the EJB classes may be defined in a java archive (JAR) file, and the test scripts 12 may be generated from the JAR file. In other embodiments, however, the basis transaction may merely provide a basis to normalize the repetition frequency of the other transactions. In the present embodiment, the basis transaction executes in every iteration of the loop of the test script 12. It will be appreciated that the present technique has application in instances or environments where introductory or prefacing transactions must be considered.

The rest of the blocks of instructions encapsulate API calls that are conditioned on a determination of how many times the associated transaction type should be executed per loop iteration. The API calls generate transactions that may be termed "non-basis transactions" to distinguish them from the basis transaction. The transaction iteration calculator 14 is called within each block of instructions to determine how many iterations of the associated transaction type should be executed—zero iterations, one iteration, or more than one iteration. The block of instructions invokes the API call for the associated transaction the number of times indicated by the transaction iteration calculator 14.

The transaction iteration calculator 14 uses the forecasts 18 to determine how often each transaction type should execute proportional to the frequency of the basis transaction. The transaction iteration calculator 14 provides for a realistic balance or mix of transactions of each transaction type relative to the basis transaction. A realistic balance or mix of transaction types is preferred for load testing. The transaction iteration calculator 14 may be invoked as a function call or a method call and returns a non-negative integer number.

If the forecast frequency for the transaction type is less than the forecast frequency for the basis transaction, the transaction iteration calculator 14 determines that either one or zero transactions of the transaction type are to be generated. A number K is calculated as a random integer between zero and the frequency of the basis transaction: K=rand(0, basisFrequency). Randomizing functions or pseudorandom number generators are well known to those skilled in the art and may be provided in programming language function libraries or class libraries and other randomizing functions may be used. If the number K is less than the frequency of the transaction type under consideration, then the transaction iteration calculator 14 outputs a value of one, otherwise the transaction iteration calculator 14 outputs a zero. While the return of a one or a zero is random, across many iterations of the loop of the test script 12 the mix of transactions of the transaction type to the basis transaction tends towards the mix represented by the forecasts.

If the forecast frequency for the transaction type is equal to or greater than the forecast frequency for the basis transaction, the transaction iteration calculator 14 determines that from zero to multiple transactions of the transaction type are to be generated. A number M is calculated by dividing the forecast for the transaction type by the forecast of the basis transaction: M={(transactionForecast)/(basisForecast)}*2. A number K is calculated as a random integer between zero and M: K=rand(0, M). The transaction iteration calculator 14 outputs the number K, and the test script instruction block associated with the transaction type repeatedly calls the API K times to generate K transactions of the transaction type. Again, while the number K is random, across many iterations of the loop of the test script 12 the mix of transaction requests of the transaction type to the basis transaction tends towards the mix represented by the forecasts.

In the preferred embodiment, it is understood that the basis transaction iterates one time per pass through the loop. This being the case, it may not be necessary to invoke the transaction iteration calculator 14 to determine that the basis transaction iterates one time. In an embodiment, the transaction iteration calculator 14 may be invoked to support a uniform, flexible execution architecture.

Pseudo code describing the function of the transaction iteration calculator 14 is provided below to clarify the textual description above.

```
int calculateTransactionIterations(basisFrequency, transactionFrequency) {
    int K, M;
    if (transactionFrequency < basisFrequency) {
        K=rand(0, basisFrequency);
        if (K < basisFrequency) {return 1;}
        else {return 0;}
    } else {
        M = (transactionFrequency/basisFrequency)*2;
        K=rand(0, M);
        return K;
    }
}
```

The above pseudocode is exemplary only, may neglect to include operations desirable or necessary for production quality code such as error handling or inclusion of libraries, and is provided merely to clarify the textual description above of the present embodiment. In an embodiment, the method call may employ different arguments. For example, in the preferred embodiment the transaction iteration calculator 14 is implemented in a Java class and the object instance of the Java class is initialized, by calling the constructor of the Java class, with the forecasts 18. When the transaction iteration calculator 14 is invoked, the transaction type is identified in the argument and both the forecast frequency of the basis transaction and the subject transaction are looked up from the initialized information stored in the object.

In an embodiment, a refinement of the above calculation may be employed if the additional calculation burden is acceptable in exchange for greater accuracy.

```
int Z = basisFrequency - 1; /* a constant */
int calculateTransactionIterations(basisFrequency, transactionFrequency) {
    int K, M, L, R;
    if (transactionFrequency < basisFrequency) {
        K=rand(0, basisFrequency);
        if (K < basisFrequency) {return 1;}
        else {return 0;}
    } else {
        L = transactionFrequency*2;
        M = L/basisFrequency;
        K=rand(0, M);
        R = L % basisFrequency;
        if ((rand(0, Z)) > (Z - R)) {K++};
        return K;
    }
}
``` where the operator "%" represents the integer remainder function and "K++" means to increment the value of K by 1. A number of other techniques or refinements of the basic algorithm are contemplated by the present disclosure. The constant Z may alternately be calculated inside the "else" block for sake of ease of maintenance.

Figure 2:
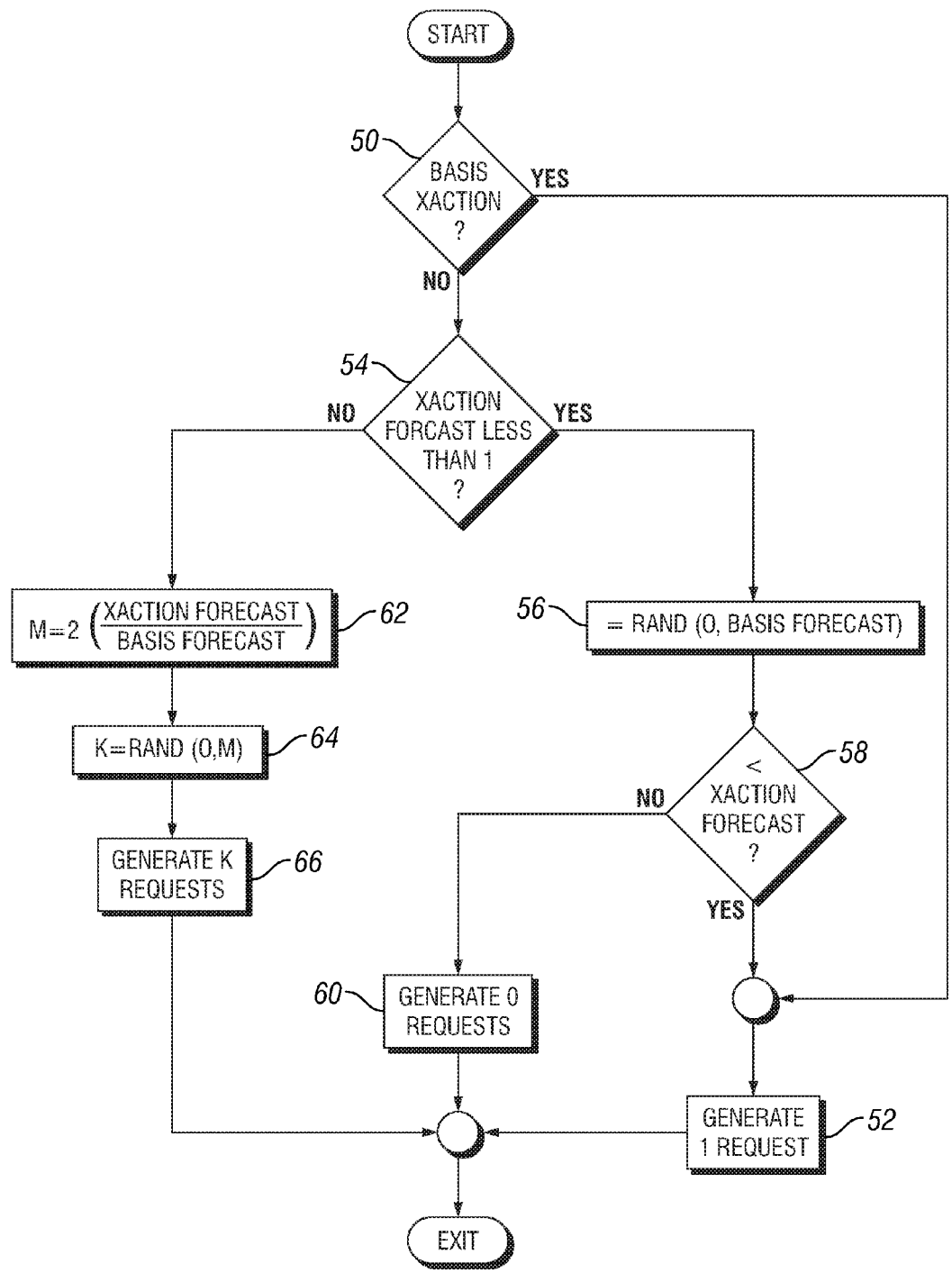
FIG. 2 is a flow chart of a method, according to one embodiment of the present disclosure, for determining a number of transaction requests of a transaction type to achieve a transaction mix based on a forecast.

Turning to FIG. 2, a flow chart of a method for determining the number of transactions to generate for a subject transaction type is depicted. At block 50 if the subject transaction type is the basis transaction, the method proceeds to block 52 where it is determined to generate one transaction of the subject transaction type. The method then exits.

At block 50 if the subject transaction type is a non-basis transaction type, the method proceeds to block 54. At block 54 if the subject transaction type has an associated forecast that is less than the forecast associated with the basis transaction, the method proceeds to block 56 where a number K is calculated to be a random number between 0 and the forecast associated with the basis transaction. The method proceeds to block 58 where if the number K is less than the forecast associated with the subject transaction type, the method proceeds to block 52 where it is determined to generate one transaction of the subject transaction type. The method exits. If the number K is equal to or greater than the forecast associated with the subject transaction type, the method proceeds to block 60 where it is determined to generate zero transactions of the subject transaction type. The method then exits.

At block 54, if the subject transaction type has an associated forecast that is equal to or greater than the forecast associated with the basis transaction, the method proceeds to block 62 where a number M is calculated as 2 times the forecast associated with the subject transaction type divided by the forecast associated with the basis transaction. Any fractional part of the number M is truncated, leaving a whole number integer. The method proceeds to block 64 where a number K is calculated to be a random number between 0 and the forecast associated with the subject transaction type. The method proceeds to block 66 where it is determined to generate K transactions of the subject transaction type. The method then exits.

The generation of transactions for transaction types having a forecast which is greater than the forecast associated with the basis transaction may result in unrealistic clustering of transactions of these transaction types. For example, a transaction type R having a forecast four times larger than the forecast associated with the basis transaction may have eight transactions of the transaction type R generated and sent to the computer system 22 in rapid succession. In an alternate embodiment, the non-basis transactions may be generated, stored to a file, the basis transaction generated, and then the remaining transactions be read at random from the file. By reading randomly from the file the clustering of transactions may be reduced without altering the transaction mix.

The appropriate transaction type mix or balance is provided by the transaction iteration calculator 14. The desirable volume of transactions is provided by how many test scripts the test controller 16 starts. The UI 24 is employed to command the test controller 16 to start additional test scripts 12 until the desirable volume of transactions is attained. In one embodiment, the test controller 16 may be a third party software application, such as Mercury LoadRunner.

The test controller 16, the test script 12, and the transaction iteration calculator are software components or computer programs which may execute on a general purpose computer system. General purpose computer systems are described in greater detail hereinafter.

Figure 3:
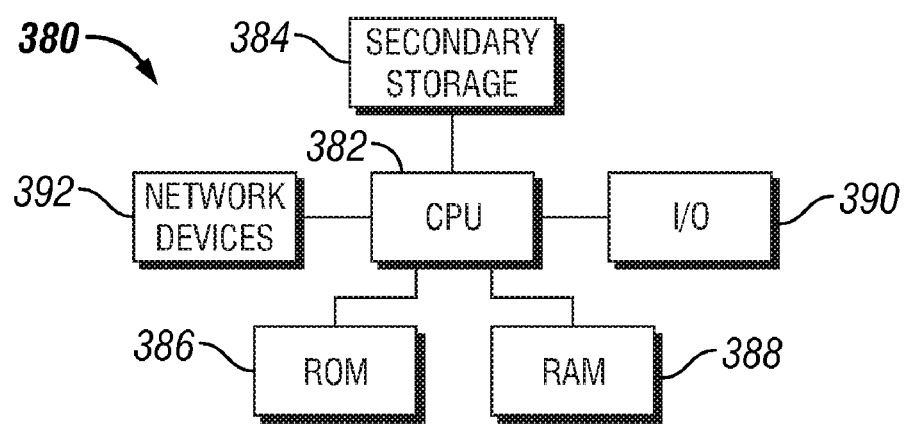
FIG. 3 illustrates an exemplary general purpose computer system suitable for implementing the several embodiments of the disclosure.

The system 10 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, which may be referred to herein as transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system running on a processor to load test a computer system, comprising:
a test script stored on a computer readable medium and executed on a processor that generates a plurality of transactions to test the computer system, the test script operable to generate a basis transaction for each iteration of the script and further operable to generate a non-basis transaction responsive to an indicator for each iteration of the script, the basis transaction having a basis transaction volume; a forecast maintaining a non-basis transaction volume of the non-basis transaction; a transaction iteration calculator stored on a computer readable medium and executed on a processor, where the non-basis transaction volume is less than the basis transaction volume, the transaction iteration calculator to randomly selects a first number related to the basis transaction volume and provides the indicator such that the test script generates the non-basis transaction, where the first number is associated with the non-basis transactions, and where a non-basis transaction volume is greater than the basis transaction volume, the transaction iteration calculator randomly selects a second number based upon the non-basis transaction volume relation to the basis transaction volume and provides the second number as the indicator to the test script to generate the second number of non-basis transactions; and a controller stored on a computer readable medium and executed on a processor to control the test script.

2. The system of claim 1 wherein the first number is randomly selected from numbers ranging up to a basis transaction volume number.

3. The system of claim 1 wherein the indicator is a Boolean variable provided by the transaction iteration calculator to the test script and used by the test script to determine whether to execute the non-basis transaction.

4. The system of claim 1 wherein the indicator is provided to generate the non-basis transaction when the first number is less than the non-basis transaction volume.

5. The system of claim 1 wherein the relation of the non-basis transaction to the basis transaction is two times a quotient of one another.

6. The system of claim 1 wherein the at least one processor, the processor executing the test script, the processor executing the transaction iteration calculator, and the processor executing the controller are the same processor.

7. The system of claim 1 wherein the at least one processor, the processor executing the test script, the processor executing the transaction iteration calculator, and the processor executing the controller are different processors.

8. A system running on a processor to load test a computer system, comprising:
a plurality of forecasts, each forecast maintaining a predicted volume of a transaction type; a transaction iteration calculator stored on a computer readable medium and executed on a processor that determines an integer number of transactions associated with each transaction type, the integer number based on the forecast associated with the transaction type and further based on the forecast associated with a basis transaction; a test script stored on a computer readable medium and executed on processor that generates a plurality of transactions, the number of transactions of each transaction type for each iteration of the test script being the integer number associated with the transaction type, and provides the transactions to the computer system; and a test controller stored on a computer readable medium and executed on a processor that starts and controls one or more instances of the test script.

9. The system of claim 8 wherein the test script is operable to repeat based on a sequence of instructions which generate transactions on each iteration, and wherein a first transaction in the sequence is the basis transaction which configures the computer system to receive subsequent transactions.

10. The system of claim 9 wherein the transactions are method calls on a stateful enterprise java bean object.

11. The system of claim 9 wherein the basis transaction is executed once per sequence of instructions, and wherein the integer number associated with non-basis transaction types is based on a random function of the forecast associated with the transaction type.

12. The system of claim 11 wherein when a first non-basis transaction type has a forecast that is less than the forecast of a basis transaction, the transaction of the first non-basis transaction type is executed once in the sequence of instructions when a first random number generated in a range from 0 to the forecast of the first transaction type is less than the forecast of the first transaction type and wherein a second transaction type that is a non-basis transaction that has a forecast that is equal to or greater than the forecast of the basis transaction is executed a second random number of times, where the second random number is generated in the range from 0 to twice the forecast of the second transaction type divided by the forecast of a basis transaction type.

13. The method of claim 12 further a plurality of test scripts operable to generate a plurality of the basis transaction and non-basis transactions, the controller operable to control execution of the plurality of test scripts.

14. The system of claim 8 wherein the forecasts are provided to the transaction iteration calculator by the test script.

15. The system of claim 8 wherein the forecasts are stored in a database and the transaction iteration calculator reads all the forecasts from the database.

16. The system of claim 8 wherein each forecast is coupled with an application programming interface call associated with the transaction type.

17. The system of claim 8 wherein a load of transactions on an application is increased by the test controller starting additional instances of the test script.

18. The system of claim 8 wherein the at least one processor, the processor executing the test script, the processor executing the transaction iteration calculator, and the processor executing the test controller are the same processor.

19. The system of claim 8 wherein the at least one processor, the processor executing the test script, the processor executing the transaction iteration calculator, and the processor executing the test controller are different processors.

20. A method for load testing a computer system, comprising:
providing a plurality of forecasts to a transaction iteration calculator, each forecast maintaining a predicted volume of a transaction type;
generating a basis transaction identified in a test script;
providing the basis transaction to the computer system;
generating a non-basis transaction identified in the test script a random number of times based on the forecast associated with the non-basis transaction and further based on the forecast associated with the basis transaction; and
providing the non-basis transactions to the computer system.

21. The method of claim 20 wherein each forecast is coupled with an application programming interface call associated with the transaction type.

22. The method of claim 20 wherein the random number of times is determined for the non-basis transaction having a forecast that is less than the forecast associated with the basis transaction type to be one if a random number generator requested to generate a random number between zero and the forecast associated with the basis transaction generates a number less than the forecast associated with a non-basis transaction type and to be zero otherwise.

23. The method of claim 20 wherein the random number of times is determined for the non-basis transaction having a forecast that is equal to or greater than the forecast associated with the basis transaction to be the number generated by a random number generator requested to generate a random number between 0 and two times the forecast associated with a non-basis transaction type divided by the forecast associated with the basis transaction.

24. The method of claim 20 further comprising:
while testing the computer system:

repeating generation of the basis transaction and non-basis transactions; and providing the basis and non-basis transactions to the computer system to load test the computer system.

25. The method of claim 24 further comprising a controller operable to control execution of the test script.

* * * * *